US009127406B2

(12) United States Patent
Zhou et al.

(10) Patent No.: US 9,127,406 B2
(45) Date of Patent: Sep. 8, 2015

(54) SURFACE COATING COMPOSITION FOR INKJET MEDIA

(75) Inventors: Xiaoqi Zhou, San Diego, CA (US); Xulong Fu, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 197 days.

(21) Appl. No.: 13/132,701

(22) PCT Filed: Dec. 8, 2008

(86) PCT No.: PCT/US2008/085907

§ 371 (c)(1), (2), (4) Date: Jun. 3, 2011

(87) PCT Pub. No.: WO2010/068193

PCT Pub. Date: Jun. 17, 2010

(65) Prior Publication Data

US 2011/0244148 A1 Oct. 6, 2011

(51) Int. Cl.

| | |
|---|---|
| ***C09D 11/00*** | (2014.01) |
| ***B32B 27/00*** | (2006.01) |
| ***C08J 7/04*** | (2006.01) |
| ***G03G 5/10*** | (2006.01) |
| ***B41M 5/00*** | (2006.01) |
| ***B41M 5/40*** | (2006.01) |
| ***D21H 19/38*** | (2006.01) |
| ***B41M 5/52*** | (2006.01) |
| ***D21H 19/44*** | (2006.01) |

(52) U.S. Cl.

CPC ................. *D21H 19/38* (2013.01); *B41M 5/52* (2013.01); *B41M 5/5218* (2013.01); *B41M 5/5227* (2013.01); *D21H 19/44* (2013.01)

(58) Field of Classification Search

CPC ......... D21H 19/39; D21H 19/44; B41M 5/52; B41M 5/5227

USPC ........... 523/160; 428/340, 341, 342, 32.1, 32, 428/34, 32.36

See application file for complete search history.

(56) References Cited

U.S. PATENT DOCUMENTS

| | | | | |
|---|---|---|---|---|
| 3,676,338 | A | 7/1972 | Fries et al. | |
| 5,916,673 | A * | 6/1999 | Fryberg et al. | 428/328 |
| 6,777,039 | B2 | 8/2004 | Koike et al. | |
| 6,797,347 | B2 | 9/2004 | Chow et al. | |
| 7,086,726 | B2 | 8/2006 | Takashima et al. | |
| 7,485,359 | B2 | 2/2009 | Tamagawa | |
| 7,641,765 | B2 | 1/2010 | Blum et al. | |
| 7,906,186 | B2 | 3/2011 | Watanabe et al. | |
| 8,256,887 | B2 | 9/2012 | Zhou et al. | |
| 2005/0237372 | A1 | 10/2005 | Kondo et al. | |
| 2005/0244592 | A1 | 11/2005 | Koga et al. | |
| 2005/0276936 | A1 * | 12/2005 | Bi et al. | 428/32.34 |
| 2007/0245503 | A1 * | 10/2007 | Jackson et al. | 8/442 |
| 2009/0317549 | A1 * | 12/2009 | Tan et al. | 427/288 |

FOREIGN PATENT DOCUMENTS

| | | | |
|---|---|---|---|
| EP | 0887199 | A2 | 12/1998 |
| EP | 1295729 | A2 | 3/2003 |
| KR | 20030027693 | A | 4/2003 |
| KR | 20060051235 | A | 5/2006 |
| KR | 20070103364 | A | 10/2007 |
| WO | 9842685 | A1 | 10/1998 |
| WO | 03016624 | A1 | 2/2003 |

OTHER PUBLICATIONS

International Search Report (ISR) and Written Opinion of the International Searching Authority (ISA) mailed Sep. 7, 2009 from ISA/KR for counterpart PCT Application No. PCT/US2008/085907 (10 pages).

Extended European Search Report (EESR) dated Apr. 4, 2014 (9 pages) with supplementary European search report and search opinion for counterpart foreign EP patent application No. 08878797.

* cited by examiner

*Primary Examiner* — Alexander Kollias

(74) *Attorney, Agent, or Firm* — Hewlett-Packard Patent Department

(57) ABSTRACT

The instant disclosure relates to a surface coating composition for inkjet media, including: a binder including at least one of water soluble polymers, water dispersible polymers, or combinations thereof; a pigment including at least one of low surface area inorganic pigments, organic pigments, porous inorganic pigments, or combinations thereof; an optical brightening agent; a metallic salt; and a chemical chelant.

21 Claims, 1 Drawing Sheet

SURFACE COATING COMPOSITION FOR INKJET MEDIA

BACKGROUND

The instant disclosure relates generally to a surface coating composition for inkjet media.

Digital printing, such as inkjet printing, is rapidly replacing traditional impact printing or "plate" printing methods, such as offset printing. It is sometimes challenging to find media which can be effectively used with such digital printing techniques. To create a superior image with inkjet printing, coated paper is typically used. Such media has single or multiple coating layers with compositions having inorganic or organic pigment as a filler along with other functional materials which promote ink receiving. Papers with coating layers generally show superior physical appearance over uncoated paper in terms of gloss and surface smoothness. In order to achieve higher brightness and whiteness, optical brightening agents (OBAs), also known as fluorescent whitening agents (FWAs), are often added into the coating composition.

To improve the total image quality, metallic salts, such as multi-valent salts like calcium chloride, have been used in surface sizing processing of uncoated plain paper. The salts precipitate out the pigment dispersion from an ink solution so that the pigmented colorant substantially stays on the outermost surface layer of the media. Cations of such salts further fix anionic charged colorants in pigmented ink. This technology increases the optical density and color saturation of the printed images and reduces dry time of such images. It also improves the print quality by sharpening dot edge. One drawback of this technology is the quench effect that these salts have on optical brightening agents (OBAs). OBAs are generally very sensitive to salts, and especially to ionic contamination in salts. The CIE whiteness per the International Organization for Standardization (ISO) method 11475, for example, can drop as much as 3-4 units after adding salts.

BRIEF DESCRIPTION OF THE DRAWINGS

Features and advantages of embodiments of the instant disclosure will become apparent by reference to the following detailed description and drawings, in which.

DETAILED DESCRIPTION

Figure 1:
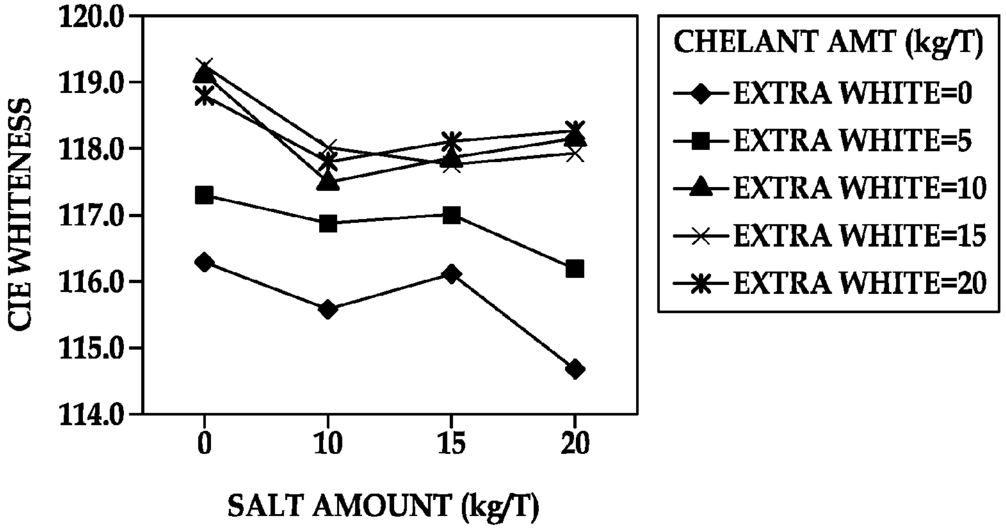
FIG. 1 is a graph plotting CIE whiteness vs. Salt Content in an embodiment of the instant disclosure.

With the addition of metallic salts, such as divalent metal salts, into coating layers of coated media, pigment-based ink performance, such as black optical density (KOD), dry time and color saturation, significantly improves. However, when metallic salts are added to layers which also contain OBAs and other typical additives, a negative effect on brightness and whiteness is often observed. The salts usually quench much of the effectiveness of OBAs. When a low grade of salt is used, the salt often contains metal contaminants such as $Fe^{+++}$ and $Cu^{++}$ ions, which may drastically degrade paper brightness and whiteness. To maintain brightness and whiteness of the coated paper when salts are added with the OBAs, the dosage of the OBAs is often increased. However, sometimes the loss of whiteness/brightness cannot be compensated for by adding extra amounts of costly OBAs. This may be due, at least in part, to the inevitable paper "greening" effect resulting from the OBAs themselves. As such, the increase of OBAs results in significantly higher costs, and excessive amounts of OBAs may cause the "greening" effect, which alters the color hue of the coated paper. The "greening" effect is caused when light is reflected from the surface of the coated paper at wavelengths above the blue region and into the green region of the visible spectrum. Reflected light of wavelengths within the blue region of the visible spectrum enhance the "whitening effect" of the OBAs by making the coated papers look less yellow. However, reflected light of wavelengths within the green region of the visible spectrum has the opposite effect.

In addition, applicants previously disclosed (see e.g., PCT/US08/56237 filed Mar. 7, 2008) that the multivalent metallic salts that have been added to uncoated plain paper to improve the total image quality have the effect of quenching the OBAs. This results in decreasing the whitening/brightening effectiveness of the OBAs. In order to compensate for the quenching effect resulting from the addition of the multivalent metallic salts, previous coatings have included OBAs in amounts that may, in some instances, be undesirably close to amounts which would result in the "greening effect". Furthermore, the use of such high amounts of OBAs may increase the cost of the resulting media because of the high cost of OBAs.

The applicants have, in PCT/US08/56237 filed Mar. 7, 2008, disclosed a method to avoid the quenching of the OBAs. Such method involves using chelants along with the multivalent metallic salt as a coating on plain paper. The methods disclosed use smaller amounts of expensive OBAs while still achieving the desired whiteness/brightness effect and avoiding "greening". It appears that the chelants have the effect of partially binding the salts, thus hindering their quenching effect on the OBAs.

In the present application, the applicants have found methods to effectively combine OBAs, metallic salts, and chelants so that the combination may be used effectively to increase whiteness in pigment-based paper coatings. The combinations disclosed herein maximize the whiteness/brightness of the paper, reduce the amounts of OBAs that are used, and avoid the "greening" effect. Embodiments of the coating, including examples of suitable OBAs, metallic salts, and chelants, and suitable ranges for each, are described further hereinebelow.

Embodiments of the coated inkjet printing media set forth in this disclosure include a base substrate, such as a cellulose paper, and a coating composition applied thereon. In an embodiment, the cellulose base paper has a basis weight ranging from 35 gsm to 250 gsm, and from 5% to 35% by weight of filler. The base paper includes mechanical pulp (groundwood pulp, thermomechanical pulp, and chemo-thermomechanical pulp), wood-free pulp, and/or non-wood fiber, such as Bagasse or bamboo. To achieve the maximum ink absorption, thereby optimizing the image quality, the internal sizing/surface sizing of the base paper is carefully controlled with the Cobb value ranging from 22 gsm to 30 gsm and the Bristow absorption value ranging from 18 ml/$m^2$ to 30 ml/$m^2$.

In order to investigate the brightness/whiteness and greening effects of OBAs on these coated papers, chemical chelant agents and salts are added during the coating process. As described herein, there are no OBAs added in the base papermaking process, i.e., the wet end of the paper making. In one embodiment, the coating composition is directly applied on either a single side or on both sides of the base substrate. The composition forms an ink receiving layer (also referred to herein as an ink receptive coating) on the base substrate. The coating composition includes pigments (fillers), binders, salts, chemical chelant agents, OBAs, and, in some instances, other additives that aid processing.

The binder used in the coating formulation supplies binding adhesion among pigments, and between pigments and base substrate. Suitable binders include water soluble polymers (such as polyvinyl alcohol, starch derivatives, gelatin, cellulose derivatives, or acrylamide polymers), water-dispersible polymers (such as acrylic polymers or copolymers, vinyl acetate latex, polyesters, vinylidene chloride latex, or styrene-butadiene or acrylonitrile-butadiene copolymer latex). The amount of binder used in the formulation is related to the type and amount of pigments used. The amount of binder used may be measured by "wet-pick" and "dry-pick" strength. In one embodiment, the binder amount ranges from about 5 parts to about 20 parts by weight per 100 parts by weight pigments.

In one embodiment, suitable pigments used in the coating compositions are inorganic pigments with relatively low surface area, including, but not limited to, clay, kaolin, calcium carbonate, talc, titanium dioxide, and zeolites. Still further, the inorganic pigments may be any kind of white inorganic pigments. In another embodiment, inorganic pigments which include a plurality of pore structures are utilized to provide a high degree of absorption capacity for liquid ink vehicle via capillary action and other similar means. Examples of such porous inorganic pigments are synthesized amorphous silica, colloidal silica, alumina, colloidal alumina, and pseudoboehmite (aluminum oxide/hydroxide). In another embodiment, suitable pigments are organic pigments, such as polyethylene, polymethyl methacrylate, polystyrene and its copolymers, polytetrafluoroethylene (Teflon®) powders, and/or combinations of such pigments. It is to be understood that the organic pigments may be in the solid state or in a form often referred to as "hollow" particles. In still another embodiment, any combination of the previously listed pigments may be utilized.

The range for the amount of any of the pigments in the composition is from about 60% to about 95% by total dry weight of the ink receptive coating. Preferably, the total amount of pigments ranges from about 70% to about 85% by total dry weight of the ink receptive coating.

In an embodiment, the low surface area inorganic pigments described above may be utilized as primary particles as they are, or are in a state of forming, secondary condensed particles with a structure of higher porosity. An example of such higher porosity particles is kaolin clay. Structured kaolin clay particles can be formed by subjecting hydrous clays to calcination at an elevated temperature or to chemical treatments, as are known. Such processes bind the clay particles to each other to form larger aggregate clay particles. The aggregated particles thus act to increase the void volume.

In another embodiment, the porous inorganic pigments can be mixed with the low surface area inorganic pigments and/or organic pigments at a weight percent ratio ranging from 5% to 40% of porous inorganic pigments to other pigments in order to improve the ink absorption while not sacrificing other physical performance attributes, such as gloss.

The metallic salts used in the surface coating composition may include water-soluble mono- or multi-valent metallic salts. The metallic salts may include cations of monovalent metal ions, multiple valent metal ions, combinations thereof, and/or derivatives thereof. Examples include Group I metals, Group II metals, and Group III metals. The metallic salt may include metal cations, such as potassium, sodium, calcium, magnesium, barium, strontium, and aluminum ions, various combinations thereof, and/or derivatives thereof. In an embodiment, the metallic salts have cations such as calcium, magnesium, aluminum, combinations thereof, and/or derivatives thereof. The metallic salt may include anions, such as fluoride, chloride, iodide, bromide, nitrate, chlorate, and acetate ions, various combinations thereof, and/or derivatives thereof. Anions which are known to readily interact with and bind with the paper pulp are excluded from use with the metallic salt. Such anions include, as non-limiting examples, anions based on sulfur and phosphorous.

The effective amount of water-soluble and/or water dispersible metallic salts used in the surface coating composition depends upon, at least in part, the type of ink used, the amount of surface coating composition applied to the base paper substrate, and the type of base paper stock used. In an embodiment of the instant disclosure, the amount of water-soluble and/or water-dispersible metallic salts may range from 1 kg per metric ton (T) of dry base paper stock to 25 kg/T as measured with a base paper substrate of 100 grams per square meter (gsm). In an embodiment, the amount of metallic salts in the composition ranges from about 5 kg/T to about 15 kg/T as measured with a base paper substrate of 100 gsm. The applicants have found that at amounts below 1 kg/T as measured with a paper substrate of 100 gsm, the metallic salts are not able to effectively precipitate the colorant pigments from the ink suspension before they penetrate into the paper bulk layer. Thus, when present at amounts below this level, the salts cannot achieve their image quality improving effect. By 5 kg/T of salts, the image quality improving effect is clearly manifested. At or above 15 kg/T, the improvement in image quality is believed to reach a plateau. Above 15 kg/T, the quenching effect on the OBAs manifests itself. By 25 kg/T, the quenching effect on the OBAs is more noticeable.

As such, a suitable range of OBAs for achieving workable levels of improved image quality and whiteness/brightness effect is from 1 kg/T to 25 kg/T as measured with a base paper substrate of 100 gsm. In some instances, the amount of OBAs ranges from 5 kg/T to 15 kg/T as measured with a base paper substrate of 100 gsm may be suitable for achieving optimum levels of both improved image quality and whiteness/brightness effect.

Throughout the instant disclosure, amounts of OBAs, chelants or metallic salts are provided in units of kg/T of base paper substrate with basis weight of 100 gsm. When another base paper substrate with different basis weight is used, it is to be understood that one skilled in the art can readily convert the amount of OBAs, chelant and metallic salt according to the net weight of the base substrate since the total coating amount applied in gsm is independent of the basis weight of the substrate.

In an embodiment, the chelant used in the coating composition is a compound selected from the group consisting of organic phosphonate, phosphate, carboxylic acids, dithiocarbamates, salts of any of the previous members, and any combinations thereof. Sulfites and phosphines with S—O and P—O bonds, respectively, can also be compounded in chemical chelant compositions. As a non-limiting example, the composition commercially available under the trade name EXTRA WHITE®, manufactured by Nalco Inc., of Naperville, Ill., USA includes one or more of the chelants, as well as one or more of the sulfites and/or phosphines described above. The EXTRA WHITE® chelant mixture may be incorporated into the coating composition containing metallic salts. The workable level of chemical chelants ranges from about 2 kg/T to about 20 kg/T of paper substrate as measured with a base paper substrate of 100 gsm. In an embodiment for reaching optimum levels, the chemical chelant range is from about 5 kg/T to 15 kg/T of paper substrate as measured with a base paper substrate of 100 gsm. The applicants have found that below 2 kg/T per metric ton of paper substrate, the chelants are not able to effectively prevent the quenching effect. At 5 kg/T and above, the effect of the chelants is substantially manifested. It has been found that the effect increases up to 15 kg/T. Between 15 kg/T and 20 kg/T, however, the increasing effect seems to reach a plateau. Above 20 kg/T the chelant's effectiveness at preventing quenching remains substantially flat. Due, at least in part, to the cost of adding increased amounts of chelant, it may not be desirable to increase the amount in the composition beyond the 20 kg/T amount.

As mentioned hereinabove, in an embodiment, the chelant is a compound selected from the group consisting of organic phosphonate, phosphate, carboxylic acids, dithiocarbamates, salts of any of the previous compounds, and any combinations thereof.

"Organic phosphonates" mean organic derivatives of phosphonic acid. Non-limiting examples include $HP(O)(OH)_2$, containing a single C—P bond, such as HEDP($CH_3C(OH)(P(O)(OH)_2)$, 1-hydroxy-1,3-propanediylbis-phosphonic ($(HO)_2P(O)CH(OH)CH_2CH_2P(O)(OH)_2$)); preferably containing a single C—N bond adjacent (vicinal) to the C—P bond, such as DTMPA ($(HO)_2P(O)CH_2N[CH_2CH_2N(CH_2P(O)(OH)_2)_2]_2$), AMP ($N(CH_2H(O)(OH)_2)_3$), PAPEMP ($((HO)_2P(O)CH_2)_2NCH(CH_3)CH_2(OCH_2CH(CH_3))_2N(CH_2)_6N(CH_2P(O)(OH)_2)_2$), HMDTMP ($(HO)_2P(O)CH_2)_2N(CH_2)_6N(CH_2P(O)(OH)_2)_2$), HEBMP ($N(CH_2P(O)(OH)_2)_2CH_2CH_2OH$), and the like.

"Organic phosphates" mean organic derivatives of phosphorous acid, $P(O)(OH)_3$, containing a single C—P bond. Non-limiting examples include triethanolamine tri(phosphate ester) ($N(CH_2CH_2OP(O)(OH)_2)_3$), and the like.

"Carboxylic acids" mean organic compounds containing one or more carboxylic group(s), —C(O)OH. Non-limiting examples include aminocarboxylic acids containing a single C—N bond adjacent (vicinal) to the C—$CO_2H$ bond, such as EDTA ($(HO_2CCH_2)_2NCH_2CH_2N(CH_2CO_2H)_2$), DTPA ($(HO_2CCH_2)_2NCH_2CH_2N(CH_2CO_2H)CH_2CH_2N(CH_2CO_2H)_2$), and the like, and alkaline and alkaline earth metal salts thereof.

"Dithiocarbamates" include, as non-limiting examples, monomeric dithiocarbamates, polymeric dithiocarbamates, polydiallylamine dithiocarbamates, 2,4,6-trimercapto-1,3,5-triazine, disodium ethylenebisdithiocarbamate, disodium dimethyldithiocarbamate, and the like.

In an embodiment, the chelant is a phosphonate. In a further embodiment, the phosphonate is diethylene-triamine-pentamethylene phosphonic acid (DTMPA) and salts thereof. In another embodiment, the chelant is a carboxylic acid. In a further embodiment, the carboxylate is selected from diethylenetriaminepentaacetic acid (DTPA) and salts thereof, and ethylenediaminetetraacetic acid (EDTA) and salts thereof. Sulfites and phosphines with S—O and P—O bonds, respectively, can also be compounded in chemical chelant compositions.

OBAs are fluorescent dyes or pigments that absorb ultraviolet radiation and reemit such radiation at a higher wavelength in the visible spectrum (blue), thereby resulting in a whiter, brighter appearance of the paper sheet. Representative OBAs include, but are not limited to: azoles; biphenyls; coumarins; furans; ionic brighteners, including anionic, cationic, and anionic (neutral) compounds: naphthalimides; pyrazenes; substituted (e.g., sulfonated) stilbenes; salts of such compounds including but not limited to alkali metal salts, alkaline earth metal salts, transition metal salts, organic salts, and ammonium salts; and combinations of one or more of the foregoing agents and/or salts. A workable amount for the OBAs ranges from about 2 kg/T to about 15 kg/T of paper substrate as measured with a base paper substrate of 100 gsm. In another embodiment, desirable results may be achieved when the OBAs are used in an amount ranging from about 5 kg/T to about 10 kg/T of paper substrate as measured with a base paper substrate of 100 gsm. The applicants have found that below 2 kg/T, the OBAs are not able to effectively achieve their whitening/brightening effect. Furthermore, when the OBA amount is above 15 kg/T, the paper shows a "greening" effect due, at least in part, to an overdosage of the OBAs. When OBAs are present in the 5-10 kg/T range, an optimum or desirable level of the whitening/brightening of the paper is achieved, the "greening" effect is not observed.

The addition of chelants to the combination of OBAs and metallic salts within the ranges provided herein in the coating composition results in a higher brightness and whiteness level in the coating while allowing a reduced amount of OBAs to be used. Thus, the use of the chelant in the coating composition results in desirable whiteness/brightness quality at a lower cost, without the "greening effect".

The coating composition can be applied on base paper substrate by an on-line surface size press process, such as a film-sized press, film coater or the like. The coating weight of the surface coating composition is directly related to ink absorption. The coating is more effective if the coating composition on the base paper substrate is maintained within the range of from 5 gsm to 25 gsm. Except for on-line surface sizing processing, the off-line coating technologies can also be used to apply the surface coating composition to base paper substrate. Examples of suitable coating techniques include, but are not limited to, slot die coaters, cascade coaters, roller coaters, fountain curtain coaters, blade coaters, rod coaters, air knife coaters, gravure applications, air brush applications, and other techniques and apparatuses known to those skilled in the art. An in-line or off-line calendaring process, such as hard nip, soft nip or super-calendar, may optionally be used after drying the composition to improve surface smoothness and gloss.

To further illustrate embodiment(s) of the instant disclosure, various examples of media are given herein. It is to be understood that these are provided for illustrative purposes and are not to be construed as limiting the scope of the disclosed embodiment(s).

EXAMPLE

A series of inkjet printing media were prepared using the following procedure:

(A) The paper substrates that were used for the media in this example were made on a paper machine from a fiber furnish consisting of 30% softwood (pine and birch) and 50% hardwood (eucalyptus) fibers, and 12% precipitated calcium carbonate with alkenyl succinic anhydride (ASA) internal size. The basis weight of the substrate paper was about 95.5 gsm. The paper substrates were surface sized with starch. The Cobb value and the Bristow absorption value of the base paper were optimized to achieve good image quality.

(B) The coating composition for each media in this example was prepared in the laboratory using a 55 gal jacked processing vessel made with stainless steel (A&B Processing System Corp., Strafford, Wis.). A Lighthin mixer (Lighthin Ltd, Rochester N.Y.) mixer with gear ratio 5:1 and a speed of 1500 rpm was used to mix the formulation. The appropriate amount of water is first charged into the vessel followed by inorganic pigments and other polymeric binders and/or additives, such as polyvinyl alcohol. The powder of a metallic salt, such as calcium chloride (technical grade), was pre-dissolved into a 30% by weight solution in a metal container, and then was mixed into the vessel in an appropriate amount. After adding the metallic salt, the chemical chelant agent was added and the OBAs (optical brightness agents) were added into the vessel. Optionally, other coating additives such as a pH controlling agent, a water retention agent, a thickener agent and a surfactant may be added into the vessel. The coating process was accomplished either in small quantities by hand draw-down using a Mayer rod in a plate coating station, or in a large quantity by a pilot coater equipped with a blade as the metering device.

The exemplary formulation of the surface coating composition may include (as a non-limiting example) the following chemical components: Mowiol 15-79® solution (14%); Foamaster VF®; Covergloss®; Ansilex 93®; Rovene 4040®; Calcium Chloride solution (40%); Leucophor NS LIQ®; and Extra-White®.

The sources of the components named above include: Mowiol 15-79® is polyvinyl alcohol, available from Clariant Corporation; Foamaster VF® is a petroleum derivative defoamer, available from Cognis Corporation; Covergloss® is kaolin clay, available from J. M. Huber Corporation; Ansilex 93® is calcined kaolin clay, available from Engelhard Corporation; Rovene 4040® is a styrene butadiene emulsion, available from Mallard Creek Polymers, Inc; Leucophor NS LIQ® is an anionic optical brightening agent, one of the OBAs available from Clariant Corporation; and Extra White® is the chemical chelant agent, available from Nalco Company.

The coating weight of the coating was from about 10 gsm to about 12 gsm. The coated paper was dried and then calendared at 60° C. under a pressure of from 1000 to 3000 pound per square inch (psi) using a laboratory soft-calendar.

Figure 2:
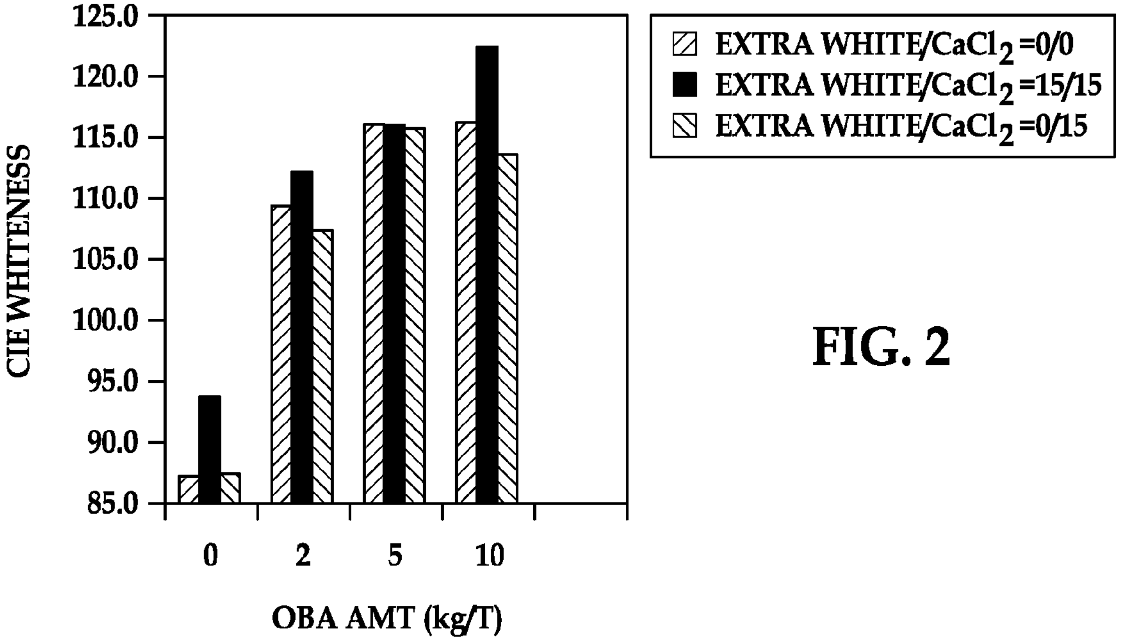
FIG. 2 is a bar graph comparing CIE whiteness at various Optical Brightness Agent (OBAs) amounts in an embodiment of the instant disclosure.

CIE whiteness was determined using Colortouch from Technidyne Company per ISO method 11475 at D65/10 degree. CIE whiteness measurements (Y axis) for media 1-20 are plotted against salt content (dry parts by weight in kg/T) (X axis) in FIG. 1. CIE whiteness measurements (Y axis) for media 21-32 are compared in bar graphs at several different amounts of OBAs (dry parts by weight in Kg/T) (X axis) in FIG. 2.

As described above, applicants have separately disclosed that chelants had the positive effect of reducing the amount of OBAs needed in the combination of OBAs and salts used to treat the surface of plain inkjet printing paper. It would not necessarily follow that chelants combined with OBAs and salts would have a comparable positive effect on a pigment and binder coating composition applied to a paper substrate. The results shown in FIGS. 1 and 2 demonstrate the positive effects on the whiteness of a pigment/binder surface coating when increased amounts of chelants were added to samples with a) combinations of salts and OBAs with increasing amounts of salts (FIG. 1) and b) combinations of salts and OBAs with increasing amounts of OBAs (FIG. 2) respectively.

Media 1-20: (kg/T as measured with a base paper substrate of 100 gsm)

| | Mowiol 15-79 ® Parts | Foamaster VF ® Parts | Covergloss ® Parts | Ansilex 93 ® Parts | Rovene 4040 ® Parts | $CaCl_2$ (kg/T) | Leucophor NS LIQ ® (kg/T) | Extra-White ® (kg/T) |
|---|---|---|---|---|---|---|---|---|
| Medium 1 | 8.1 | 0.1 | 70 | 30 | 2.5 | 0 | 5 | 0 |
| Medium 2 | 8.1 | 0.1 | 70 | 30 | 2.5 | 10 | 5 | 0 |
| Medium 3 | 8.1 | 0.1 | 70 | 30 | 2.5 | 15 | 5 | 0 |
| Medium 4 | 8.1 | 0.1 | 70 | 30 | 2.5 | 20 | 5 | 0 |
| Medium 5 | 8.1 | 0.1 | 70 | 30 | 2.5 | 0 | 5 | 5 |
| Medium 6 | 8.1 | 0.1 | 70 | 30 | 2.5 | 10 | 5 | 5 |
| Medium 7 | 8.1 | 0.1 | 70 | 30 | 2.5 | 15 | 5 | 5 |
| Medium 8 | 8.1 | 0.1 | 70 | 30 | 2.5 | 20 | 5 | 5 |
| Medium 9 | 8.1 | 0.1 | 70 | 30 | 2.5 | 0 | 5 | 10 |
| Medium 10 | 8.1 | 0.1 | 70 | 30 | 2.5 | 10 | 5 | 10 |
| Medium 11 | 8.1 | 0.1 | 70 | 30 | 2.5 | 15 | 5 | 10 |
| Medium 12 | 8.1 | 0.1 | 70 | 30 | 2.5 | 20 | 5 | 10 |
| Medium 13 | 8.1 | 0.1 | 70 | 30 | 2.5 | 0 | 5 | 15 |
| Medium 14 | 8.1 | 0.1 | 70 | 30 | 2.5 | 10 | 5 | 15 |
| Medium 15 | 8.1 | 0.1 | 70 | 30 | 2.5 | 15 | 5 | 15 |
| Medium 16 | 8.1 | 0.1 | 70 | 30 | 2.5 | 20 | 5 | 15 |
| Medium 17 | 8.1 | 0.1 | 70 | 30 | 2.5 | 0 | 5 | 20 |
| Medium 18 | 8.1 | 0.1 | 70 | 30 | 2.5 | 10 | 5 | 20 |
| Medium 19 | 8.1 | 0.1 | 70 | 30 | 2.5 | 15 | 5 | 20 |
| Medium 20 | 8.1 | 0.1 | 70 | 30 | 2.5 | 20 | 5 | 20 |

Media 21-32: (kg/T as measured with a base paper substrate of 100 gsm)

| | Mowiol 15-79 ® Parts | Foamaster VF ® Parts | Covergloss ® Parts | Ansilex 93 ® Parts | Rovene 4040 ® Parts | $CaCl_2$ (kg/T) | Leucophor NS LIQ ® (kg/T) | Extra-White ® (kg/T) |
|---|---|---|---|---|---|---|---|---|
| Medium 21 | 8.1 | 0.1 | 70 | 30 | 2.5 | 0 | 0 | 0 |
| Medium 22 | 8.1 | 0.1 | 70 | 30 | 2.5 | 0 | 2 | 0 |
| Medium 23 | 8.1 | 0.1 | 70 | 30 | 2.5 | 0 | 5 | 0 |
| Medium 24 | 8.1 | 0.1 | 70 | 30 | 2.5 | 0 | 10 | 0 |
| Medium 25 | 8.1 | 0.1 | 70 | 30 | 2.5 | 15 | 0 | 15 |
| Medium 26 | 8.1 | 0.1 | 70 | 30 | 2.5 | 15 | 2 | 15 |
| Medium 27 | 8.1 | 0.1 | 70 | 30 | 2.5 | 15 | 5 | 15 |
| Medium 28 | 8.1 | 0.1 | 70 | 30 | 2.5 | 15 | 10 | 15 |

-continued

| | Mowiol 15-79 ® Parts | Foamaster VF ® Parts | Covergloss ® Parts | Ansilex 93 ® Parts | Rovene 4040 ® Parts | $CaCl_2$ (kg/T) | Leucophor NS LIQ ® (kg/T) | Extra-White ® (kg/T) |
|---|---|---|---|---|---|---|---|---|
| Medium 29 | 8.1 | 0.1 | 70 | 30 | 2.5 | 15 | 0 | 0 |
| Medium 30 | 8.1 | 0.1 | 70 | 30 | 2.5 | 15 | 2 | 0 |
| Medium 31 | 8.1 | 0.1 | 70 | 30 | 2.5 | 15 | 5 | 0 |
| Medium 32 | 8.1 | 0.1 | 70 | 30 | 2.5 | 15 | 10 | 0 |

While several embodiments have been described in detail, it will be apparent to those skilled in the art that the disclosed embodiments may be modified. Therefore, the foregoing description is to be considered exemplary rather than limiting.

What is claimed is:

1. A surface coating composition for inkjet media, comprising:

- a binder including at least one of water soluble polymers, water dispersible polymers, or combinations thereof, wherein the binder includes about 5 parts to about 20 parts by weight per 100 parts by weight of pigments;
- a pigment in a weight percent ratio ranging from 5% to 40% of porous inorganic pigments to one of i) an inorganic pigment selected from the group consisting of clay, kaolin, calcium carbonate, talc, titanium dioxide, zeolites, and combinations thereof, ii) organic pigments, or iii) a combination of i) and ii);
- an optical brightening agent in an amount ranging from 5 kg per metric ton to 10 kg per metric ton of the inkjet media as measured with a base paper substrate of 100 gsm;
- a metallic salt; and
- a chemical chelant selected from the group consisting of organic phosphonate, phosphate, carboxylic acids, dithiocarbamates, sulfites, phosphines, and combinations thereof, wherein the chemical chelant hinders quenching of the optical brightening agent by the metallic salt, wherein a ratio of the chemical chelant in kg per metric ton to the metallic salt in kg per metric ton in the surface coating composition ranges from 5:15 to 20:5.

2. The surface coating composition of claim 1, wherein an amount of the chemical chelant in the inkjet media ranges from about 5 kg per metric ton to about 15 kg per metric ton of the inkjet media as measured with a base paper substrate of 100 gsm.

3. The surface coating composition of claim 1, wherein the metallic salt is selected from the group consisting of monovalent metallic salts, multi-valent metallic salts, combinations thereof, and derivatives thereof.

4. The surface coating composition of claim 1, wherein the metallic salt is water soluble; wherein a cation of the metallic salt is selected from the group consisting of potassium, sodium, calcium, magnesium, barium, aluminum, strontium, derivatives thereof, and combinations thereof; wherein an anion of the metallic salt is selected from the group consisting of fluoride, chloride, iodide, bromide, nitrate, chlorate, acetate and combinations thereof; and wherein an amount of the metallic salt in the inkjet media ranges from about 5 kg per metric ton to about 15 kg per metric ton of the inkjet media as measured with a base paper substrate of 100 gsm.

5. The surface coating composition of claim 1, wherein the optical brightening agent is selected from the group consisting of di-sulphonated optical brightening agent, tetra-sulphonated optical brightening agent, hexa-sulphonated optical brightening agent, azoles, biphenyls, coumarins, furans, ionic brighteners, naphthalimides, pyrazenes, substituted stilbenes, combinations thereof, salts thereof, and combinations of the salts thereof; the salts thereof being selected from the group consisting of alkali metal salts, alkaline earth metal salts, transition metal salts, organic salts, ammonium salts and combinations thereof.

6. The surface coating composition of claim 1, wherein at least one of: the water soluble polymers are selected from the group consisting of polyvinyl alcohol, starch derivatives, gelatin, cellulose derivatives, acrylamide polymers and combinations thereof; or the water dispersible polymers are selected from the group consisting of acrylic polymers, acrylic copolymers, vinyl acetate latex, polyesters, vinylidene chloride latex, styrene-butadiene copolymer latex, acrylonitrile-butadiene copolymer pigments, and combinations thereof.

7. The surface coating composition of claim 1, wherein at least one of: the organic pigments are either in a solid state or in a hollow particle state and are selected from the group consisting of polyethylene, polymethyl methacrylate, polystyrene, copolymers of polystyrene, polytetrafluoroethylene powders, and combinations thereof; or the porous inorganic pigments are selected from the group consisting of synthesized amorphous silica, colloidal silica, alumina, colloidal alumina, pseudoboehmite, and combinations thereof.

8. The surface coating composition of claim 1, wherein the ratio of the chemical chelant in kg per metric ton to the metallic salt in kg per metric ton in the surface coating composition ranges from 10:15 to 20:10.

9. The surface coating composition of claim 1, wherein the chemical chelant is selected from the group consisting of the organic phosphonate, the phosphate, the carboxylic acids, and the dithiocarbamates, wherein:

- the organic phosphonate is selected from the group consisting of $CH_3C(OH)(P(O)(OH)_2$, $(HO)_2P(O)CH(OH)CH_2CH_2P(O)(OH)_2)$, $(HO)_2P(O)CH_2N[CH_2CH_2N(CH_2P(O)(OH)_2)_2]_2$, $N(CH_2H(O)(OH)_2)_3$, $(HO)_2P(O)CH_2)_2NCH(CH_3)CH_2(OCH_2CH(CH_3))_2N(CH_2)_6N(CH_2P(O)(OH)_2)_2$, $(HO)_2P(O)CH_2)_2N(CH_2)_6N(CH_2P(O)(OH)_2)_2$, and $N(CH_2P(O)(OH)_2)_2CH_2CH_2OH$;
- the phosphate is $N(CH_2CH_2OP(O)(OH)_2)_3$;
- the carboxylic acid is selected from the group consisting of $(HO_2CCH_2)_2NCH_2CH_2N(CH_2CO_2H)_2$ and $(HO_2CCH_2)_2NCH_2CH_2N(CH_2CO_2H)CH_2CH_2N(CH_2CO_2H)_2$; or
- the dithiocarbamate is selected from the group consisting of polydiallylamine dithiocarbamates and 2,4,6-trimercapto-1,3,5-triazine.

10. Inkjet printable paper comprising a surface coated with the surface coating composition as defined in claim 1.

11. A surface coating composition for inkjet media comprising:

- a binder including at least one of water soluble polymers, water dispersible polymers, or combinations thereof in an amount that ranges from about 5 parts to about 20 parts by weight per 100 parts by weight of pigments;

a pigment in a weight percent ratio ranging from 5% to 40% of porous inorganic pigments to one of i) an inorganic pigment selected from the group consisting of clay, kaolin, calcium carbonate, talc, titanium dioxide, zeolites, and combinations thereof, ii) organic pigments, or iii) a combination of i) and ii);

an optical brightening agent in an amount about 5 to 10 kg per metric ton of the inkjet media as measured with a base paper substrate of 100 grams per square meter;

a metallic salt; and a chemical chelant to hinder quenching of the optical brightening agent by the metallic salt, wherein a ratio of the chemical chelant in kg per metric ton to the metallic salt in kg per metric ton in the surface coating composition is within a range of 1:2 to 2:1.

12. The surface coating composition of claim 11, wherein the ratio of the amount of the chemical chelant in kg per metric ton to the amount of the metallic salt in kg per metric ton in the surface coating composition is 1:1.

13. A method of making surface-treated inkjet media, comprising:

providing a base substrate including cellulose paper;

applying the surface coating composition of claim 1 to the base substrate at a coating weight ranging from 5 gsm to 25 gsm.

14. The method of claim 13, wherein the metallic salt is selected from monovalent metallic salts, multi-valent metallic salts, combinations thereof, and derivatives thereof.

15. The method of claim 13, wherein the metallic salt is water soluble; wherein a cation of the metallic salt is selected from the group consisting of potassium, sodium, calcium, magnesium, barium, aluminum, strontium, derivatives thereof, and combinations thereof; wherein an anion of the metallic salt is selected from the group consisting of fluoride, chloride, iodide, bromide, nitrate, chlorate, acetate and combinations thereof; and wherein an amount of the metallic salt in the inkjet media ranges from about 5 kg per metric ton to about 15 kg per metric ton of the inkjet media as measured with a base paper substrate of 100 gsm.

16. The method of claim 13, wherein the optical brightening agent is selected from the group consisting of di-sulphonated optical brightening agent, tetra-sulphonated optical brightening agent, hexa-sulphonated optical brightening agent, azoles, biphenyls, coumarins, furans, ionic brighteners, naphthalimides, pyrazenes, substituted stilbenes, combinations thereof, salts thereof, and combinations of the salts thereof; the salts thereof being selected from the group consisting of alkali metal salts, alkaline earth metal salts, transition metal salts, organic salts, ammonium salts and combinations thereof.

17. The method of claim 13, wherein an amount of the chemical chelant in the inkjet media ranges from about 5 kg per metric ton to about 15 kg per metric ton of the inkjet media as measured with a base paper substrate of 100 gsm.

18. The method of claim 13, wherein at least one of: the water soluble polymers are selected from the group consisting of polyvinyl alcohol, starch derivatives, gelatin, cellulose derivatives, acrylamide polymers, and combinations thereof; or the water dispersible polymers are selected from the group consisting of acrylic polymers, acrylic copolymers, vinyl acetate latex, polyesters, vinylidene chloride latex, styrene-butadiene copolymer latex, acrylonitrile-butadiene copolymer pigments, and combinations thereof.

19. The method of claim 13, wherein the base substrate has a Cobb value of from 22 to 30 gsm and a Bristow absorption value of from 18 to 30 $ml/m^2$.

20. The method of claim 13, wherein the ratio of the chemical chelant in kg per metric ton to the metallic salt in kg per metric ton in the surface coating composition ranges from 5:15 to 20:10.

21. The method of claim 13, wherein the ratio of the chemical chelant in kg per metric ton to the metallic salt in kg per metric ton in the surface coating composition is 1:1.

* * * * *